Dec. 8, 1964  R. C. EDWARDS  3,160,266
SCRAPING AND SEALING TRAVELING GRATE SIDE WALLS
Filed Feb. 14, 1963
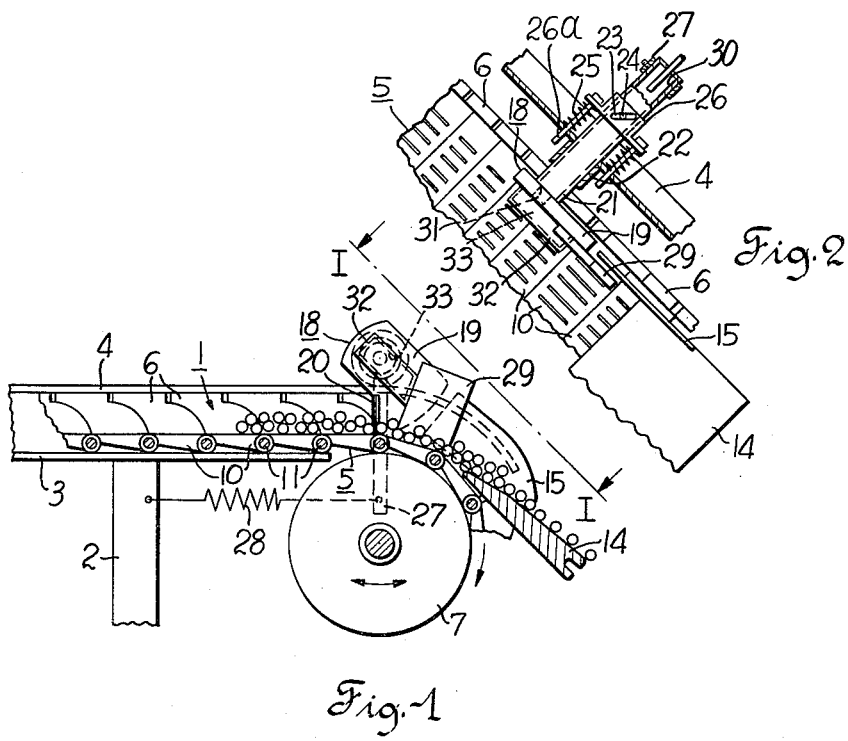

3,160,266
SCRAPING AND SEALING TRAVELING GRATE SIDE WALLS

Ray C. Edwards, Elm Grove, Wis., assignor to Allis-Chalmers Manufacturing Company, Milwaukee, Wis.
Filed Feb. 14, 1963, Ser. No. 258,399
5 Claims. (Cl. 198—230)

This invention relates to traveling grates of the type used to convey material through such as a drier, a furnace, a cooler or the like; and a device for scraping and sealing internal surfaces of conveyer side walls.

It is a feature of the present invention that the device is biased toward scraping and sealing operation against the inner surfaces of passing pieces of the conveyer side wall, yet yields to move inwardly to accommodate variations in width of the conveyer without jamming.

Another feature of the present invention is that the device is additionally biased toward scraping and sealing operation and yieldable in a second manner to pivot and swing upwardly and inwardly to permit a deformed side wall member to pass without jamming.

It is another feature of this invention that provision is made for cooling the device.

Still another feature of this invention relates to a traveling grate assembly in which a device according to this invention is mounted at a location where the conveyer turns from a horizontal path, downwardly, to discharge material, and the device at this location provides a special sealing action by overlapping an adjacent pair of side wall pieces just as they make the turn and pivot to open a space therebetween.

Other features of the invention will appear from the following description with reference to a drawing, in which:

FIG. 1 is a fragmentary and diagrammatic side view of the discharge end of a traveling grate according to this invention; and FIG. 2 is a view taken along line I—I in FIG. 1.

Referring to FIG. 1, a traveling grate assembly 1 is shown as including various stationary and movable structures. Stationary structures may include such as a vertical support 2 and horizontal supports 3, 4. Movable structures will include a material conveyer 5, side wall pieces 6 connected to move with conveyer 5 to contain material on the conveyer, and a rotary support located as indicated at 7.

The conveyer 5 may comprise a series of gas permeable grates 10 connected together as at 11. The side wall pieces 6 may be secured to grates 10 in any suitable manner. Material is discharged from conveyer 5 when the grates 10 turn from the horizontal path on supports 3 over rotating support 7 and move downwardly as indicated by arrows. To insure material discharge from grates 10, a stripping blade 14 is provided to divert flow of material to other equipment (not shown). Blade 14 is shown provided with a side wall 15.

In order to prevent material becoming jammed in the space between blade side wall 15 and passing conveyer side wall pieces 6, a combined scraping and sealing device 18 is most desirably located to overlap this space and scrape side wall pieces 6 to divert material coming off the grates 10 inwardly of side wall 15 and over blade 14.

The device 18 includes a flat plate 19 having a tapered scraper edge 20. A support shaft 21 is connected on one end to the plate 19 and perpendicular thereto. Shaft 21 is journaled in a sleeve 22, see FIG. 2. The sleeve 22 is secured to horizontal support 4 and transversely over the side wall pieces 6. From this support the plate 19 depends to a position that is parallel and adjacent the inward face of side wall pieces 6 with the scraper edge 20 pointed toward the advancing grates 10 and side wall pieces 6.

A first biasing means, here shown in FIG. 2 as a pair of springs 25 and a collar 26 arranged about shaft 21. A pair of rods 26a are connected to collar 26 and project through springs 25 and holes in support 4. The springs 25 therefore engage both a stationary support 4 and a movable collar 26. Springs 25 are biased to urge collar 26 away from sleeve 22, thus yieldable urging plate 19 against the passing side wall pieces 6. A second biasing means is shown to include an arm 27 connected to the free end of shaft 21 and as shown in FIG. 1 a spring 28 is connected to arm 27 and such as vertical support 2. Spring 28 biases shaft 21 and plate 19 to yieldable pivot shaft 21 within sleeve 22 and collar 26 to normally assume the position shown in FIG. 1 with scraper edge 20 in a vertical position when material is in contact with plate 19. A preferred arrangement is to provide for pivoting of arm 27 through an arc of about 45 degrees with about half or 22½ degrees of swing, to each side of a vertical position. The force of normal flow of material over scraper edge 20, as material on the grates 10 is peeled away from side wall pieces 6, will keep arm 27 in approximately its midposition. A cam arrangement is provided between shaft 21 and collar 26 by a cam slot 23 in collar 26 and a pin 24 connected to shaft 21 and projecting through cam slot 23. A pivotal movement of plate 19 counterclockwise (when viewed as in FIG. 1) will cause pin 24 to move in slot 23 (to the left as viewed in FIG. 2) and move plate 19 inwardly away from side wall pieces 6.

In the operation of the apparatus described, the bias of springs 25 will urge collar 26 in the direction pointed by the end of shaft 21 opposite plate 19. Plate 19 will thereby be moved into contact with side wall plates 6 and such contact will be maintained despite possible variations in the width of the conveyer 5. If one or more of the side wall plates 6 warps or becomes otherwise deformed to strike plate 19 or scraper edge 20, plate 19 will pivot (counterclockwise as viewed in FIG. 1). Such pivotal movement will also move pin 24 in slot 23 and move shaft 21 to move plate 19 inwardly away from side wall pieces 6. Such inward movement of plate 19 allows such as a warped piece 6 to pass without jamming the machine and at the same time directs material on grates 10 inwardly of such a deformed side wall piece to guard against material on grates spilling over plate 19 and side wall 15 where the material itself might jam a deformed piece 6. Sufficient space may be provided between the outer surface of side wall 15 and side wall pieces 6 so that even a deformed piece 6 can pass side wall 15 without causing a jam.

In order that plate 19 can pivot and move in the described manner and efficiently peel and guide the flow of material without jamming, a space is provided between plate 19 and blade side wall 15. In order to protect this space from passing material, a shield 29 is attached to plate 19 and overlaps side wall 15 to seal the space therebetween and also seal a space between adjacent edges of adjacent side wall pieces 6 that opens as pieces 6 pivot from a horizontal path toward the downwardly depending path.

Since the traveling grate assembly described will efficiently serve to transport material through a furnace, provision is made for cooling device 18 with, for example, air. Referring to FIG. 2, shaft 21 is shown with an internal bore 30 in communication with a bore 31 in plate 19. A wall 32 defines a chamber 33 on the side of plate 19 that will become heated. Air admitted through bore 30 passes through bore 31 and chamber 33 to cool plate 19, shield 29 and scraper edge 20.

From the foregoing it will be understood that the present invention is possessed of unique advantages. However, such modifications and equivalents of the disclosed concepts such as readily occur to those skilled in the art are intended to be included within the scope of this invention and thus the scope of this invention is intended to be limited only by the scope of the claims such as are, or may hereafter be, appended hereto.

The embodiments of the invention in which an exclusive property or privilege is claimed are defined as follows:

1. A side wall scraping device for traveling grates and the like, comprising: a flat plate having a tapered portion defining a scraper edge, a support shaft having a free end and an end connected to said plate, a first biasing means connected to the shaft and operable to yieldably urge the plate and shaft in the direction pointed by the free end of the shaft, second biasing means connected to the shaft and operable to yieldably urge the plate to pivot about the axis of the shaft in the direction pointed by the tapered portion, and a cam assembly connected to said shaft operable to move the plate and shaft against the bias of the first means in response to pivotal movement of the plate and shaft against the bias of the second means.

2. A combined side wall scraping and sealing device for traveling grates and the like, comprising, a flat plate having a tapered portion defining a scraper edge, a support shaft having a free end and an end connected to the plate, a first biasing means engaging the shaft and operable to yieldably urge the plate and shaft in the direction pointed by the free end of the shaft, an arm having a free end and an end connected to the free end of the shaft substantially perpendicular to the shaft, and a second biasing means engaging the arm and operable to yieldably urge the plate to pivot about the shaft in the direction pointed by the tapered portion of the plate.

3. A combined side wall scraping and sealing device for traveling grates and the like, comprising, a flat plate having a tapered portion defining a scraper edge, a support shaft having a free end and an end connected to the plate, a first biasing means engaging the shaft and operable to yieldably urge the plate and shaft in the direction pointed by the free end of the shaft, and said shaft also being provided with a central bore for delivering coolant to said plate.

4. A traveling grate assembly having stationary support structure, an endless material conveyer supported by the structures to provide a horizontal material carrying strand and a downwardly depending strand for discharging material therefrom, said conveyer having a plurality of upwardly projecting pieces connected thereto and defining a side wall therefor, a device for scraping and sealing the side wall defined by said pieces, said device comprising a flat plate having a tapered portion defining a scraper edge, a support shaft having a free end and an end connected to the plate, and a first biasing means engaging the shaft and operable to yieldably urge the plate and shaft in the direction pointed by the free end of the shaft, said device being arranged with its shaft transversely over the conveyer side wall with its plate depending therefrom parallel and adjacent the inward face of the side wall and with the scraper edge pointed toward advancing side wall pieces, and the first biasing means of the device is connected to the stationary support structure and urges the plate of the device against the inward face of the conveyer side wall pieces.

5. A traveling grate assembly having stationary support structure, an endless material conveyer supported by the structures to provide a horizontal material carrying strand and a downwardly depending strand for discharging material therefrom, said conveyer having a plurality of upwardly projecting pieces connected thereto and defining a side wall therefor, a device for scraping and sealing the side wall defined by said pieces, said device comprising a flat plate having a tapered portion defining a scraper edge, a support shaft having a free end and an end connected to the plate, a first biasing means engaging the shaft and operable to yieldably urge the plate and shaft in the direction pointed by the free end of the shaft, said device being arranged at a location the conveyer turns from a horizontal path toward the downwardly depending path and with its shaft transversely over the conveyer side wall with its plate depending therefrom parallel and adjacent the inward face of the side wall and with the scraper edge pointed toward advancing side wall pieces, and the first biasing means of the device being connected to the stationary support structure and urges the plate of the device against the inward face of the conveyer side wall pieces.

References Cited in the file of this patent
UNITED STATES PATENTS
2,551,123    Heller  ---------------- May 1, 1951